United States Patent
Isitman et al.

(10) Patent No.: US 10,428,205 B2
(45) Date of Patent: Oct. 1, 2019

(54) PNEUMATIC TIRE

(71) Applicant: The Goodyear Tire & Rubber Company, Akron, OH (US)

(72) Inventors: Nihat Ali Isitman, Hudson, OH (US); Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 85 days.

(21) Appl. No.: 15/692,326

(22) Filed: Aug. 31, 2017

(65) Prior Publication Data
US 2019/0062532 A1 Feb. 28, 2019

(51) Int. Cl.
| | |
|---|---|
| *C08L 9/06* | (2006.01) |
| *B60C 1/00* | (2006.01) |
| *C08K 3/36* | (2006.01) |
| *C08K 3/18* | (2006.01) |
| *C08K 3/30* | (2006.01) |
| *B60C 11/00* | (2006.01) |
| *C08L 7/00* | (2006.01) |

(52) U.S. Cl.
CPC .......... *C08L 9/06* (2013.01); *B60C 1/00* (2013.01); *B60C 1/0016* (2013.01); *B60C 11/005* (2013.01); *C08K 3/18* (2013.01); *C08K 3/30* (2013.01); *C08K 3/36* (2013.01); *C08L 7/00* (2013.01)

(58) Field of Classification Search
None
See application file for complete search history.

(56) References Cited

U.S. PATENT DOCUMENTS

| | | |
|---|---|---|
| 5,395,891 A | 3/1995 | Obrecht |
| 5,504,135 A | 4/1996 | Ardrizzi |
| 5,672,639 A | 9/1997 | Corvasce |
| 6,103,808 A | 8/2000 | Hashimoto |
| 6,127,488 A | 10/2000 | Obrecht |
| 6,133,364 A | 10/2000 | Obrecht |
| 6,146,520 A | 11/2000 | Gupte |
| 6,207,757 B1 | 3/2001 | Obrecht |
| 6,242,534 B1 | 6/2001 | Obrecht |
| 6,248,929 B1 | 6/2001 | Takashi |
| 6,372,857 B1 | 4/2002 | Obrecht |
| 6,399,697 B1 | 6/2002 | Takasaki |
| 6,410,816 B2 | 6/2002 | Takasaki |
| 6,608,125 B2 | 8/2003 | Cruse |
| 9,757,987 B2 | 9/2017 | Jacoby |
| 2001/0007049 A1 | 7/2001 | Takasaki |
| 2001/0023307 A1 | 9/2001 | Takashi |
| 2002/0000280 A1 | 1/2002 | Scholl |
| 2002/0045697 A1 | 4/2002 | Sohnen |
| 2003/0130535 A1 | 7/2003 | Deschler |
| 2004/0031548 A1 | 2/2004 | Amaddeo |
| 2006/0041063 A1 | 2/2006 | Cruse |
| 2016/0159157 A1* | 6/2016 | Jacoby .................. B60C 11/005 152/450 |
| 2017/0349733 A1 | 12/2017 | Isitman |
| 2017/0362415 A1* | 12/2017 | Iizuka ....................... B60C 1/00 |
| 2018/0154696 A1 | 6/2018 | Isitman |

FOREIGN PATENT DOCUMENTS

| | | |
|---|---|---|
| EP | 0839891 A2 | 5/1998 |
| ES | 2122917 A1 | 12/1998 |
| JP | 2002097369 A | 4/2002 |

OTHER PUBLICATIONS

European Search Report dated Oct. 29, 2018 for Application Serial No. 18188708.

* cited by examiner

Primary Examiner — Robert T Butcher
(74) Attorney, Agent, or Firm — John D. DeLong

(57) ABSTRACT

The present invention is directed to a pneumatic tire having a tread comprising a radially outer cap layer and radially inner cap layer underlying the outer cap layer; the outer cap layer comprising a vulcanizable rubber composition comprising, based on 100 parts by weight of elastomer (phr), (A) from about 80 to about 20 phr of a solution polymerized styrene-butadiene rubber having a glass transition temperature (Tg) ranging from −85° C. to −50° C.;
  (B) from about 20 to about 80 phr of natural rubber; and
  (C) from 30 to 70 phr of a process oil;
  (D) from 70 to 150 phr of silica;
wherein the weight ratio of silica to oil in the outer cap is less than 2.2;
the inner cap layer comprising a vulcanizable rubber composition comprising:
  (i) from about 60 to about 40 phr of a solution polymerized styrene-butadiene rubber having a glass transition temperature (Tg) ranging from −85° C. to −50° C.;
  (ii) from about 40 to about 60 phr of natural rubber;
  (iii) from about 5 to 40 phr of a process oil;
  (iv) optionally, from about 5 to 15 phr of a hydrocarbon traction resin; and
  (v) from 60 to 90 phr of silica;
wherein the weight ratio of silica to the sum of oil and traction resin is greater than 2.2.

6 Claims, No Drawings

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

SUMMARY OF THE INVENTION

The present invention is directed to a pneumatic tire having a tread comprising a radially outer cap layer and radially inner cap layer underlying the outer cap layer;

the outer cap layer comprising a vulcanizable rubber composition comprising, based on 100 parts by weight of elastomer (phr), (A) from about 80 to about 20 phr of a solution polymerized styrene-butadiene rubber having a glass transition temperature (Tg) ranging from −85° C. to −50° C.;

(B) from about 20 to about 80 phr of natural rubber; and (C) from 30 to 70 phr of a process oil;

(D) from 70 to 150 phr of silica;

wherein the weight ratio of silica to oil in the outer cap is less than 2.2;

the inner cap layer comprising a vulcanizable rubber composition comprising:

(i) from about 60 to about 40 phr of a solution polymerized styrene-butadiene rubber having a glass transition temperature (Tg) ranging from −85° C. to −50° C.;

(ii) from about 40 to about 60 phr of natural rubber;

(iii) from about 5 to 40 phr of a process oil;

(iv) optionally, from about 5 to 15 phr of a hydrocarbon traction resin; and (v) from 60 to 90 phr of silica;

wherein the weight ratio of silica to the sum of oil and traction resin is greater than 2.2.

DESCRIPTION OF THE INVENTION

There is disclosed to a pneumatic tire having a tread comprising a radially outer cap layer and radially inner cap layer underlying the outer cap layer;

the outer cap layer comprising a vulcanizable rubber composition comprising, based on 100 parts by weight of elastomer (phr), (A) from about 80 to about 20 phr of a solution polymerized styrene-butadiene rubber having a glass transition temperature (Tg) ranging from −85° C. to −50° C.;

(B) from about 20 to about 80 phr of natural rubber; and (C) from 30 to 70 phr of a process oil;

(D) from 70 to 150 phr of silica;

wherein the weight ratio of silica to oil in the outer cap is less than 2.2;

the inner cap layer comprising a vulcanizable rubber composition comprising:

(i) from about 60 to about 40 phr of a solution polymerized styrene-butadiene rubber having a glass transition temperature (Tg) ranging from −85° C. to −50° C.;

(ii) from about 40 to about 60 phr of natural rubber; and (iii) from about 5 to 40 phr of a process oil;

(iv) optionally, from about 5 to 15 phr of a hydrocarbon traction resin (v) from 60 to 90 phr of silica;

wherein the weight ratio of silica to the sum of oil and traction resin is greater than 2.2.

The tread includes a radially outer cap layer and a radially inner cap layer underlying the outer cap layer. Such a tread construction may be seen for example with reference to US Patent Publications 2014/0041776 and 2014/0041777. Both the outer cap layer and the inner cap layer may be exposed to contact with the ground during use of the tire, with the inner cap layer exposed upon wear of the outer cap layer. A further, non-ground contacting tread base layer may radially underlie the inner cap layer.

The rubber compositions of the outer cap layer and inner cap layer include a styrene-butadiene rubber functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group is an ethoxysilyl group.

The primary amino group and/or thiol group may be bonded to any of a polymerization initiating terminal, a polymerization terminating terminal, a main chain of the styrene-butadiene rubber and a side chain, as long as it is bonded to the styrene-butadiene rubber chain. However, the primary amino group and/or thiol group is preferably introduced to the polymerization initiating terminal or the polymerization terminating terminal, in that the disappearance of energy at a polymer terminal is inhibited to improve hysteresis loss characteristics.

Further, the content of the alkoxysilyl group bonded to the polymer chain of the (co)polymer rubber is preferably from 0.5 to 200 mmol/kg of (styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, and as taught in U.S. Pat. No. 7,342,070, the styrene-butadiene rubber is of the formula (I) or (II)

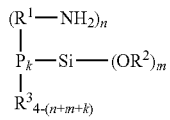

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

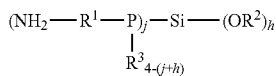

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)-aminoethyltriethoxysilne, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III

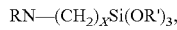

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20. In one embodiment, at least one R' group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

Suitable styrene-butadiene rubbers functionalized with an alkoxysilane group and a primary amine group are available commercially, such as HPR 340 from Japan Synthetic Rubber (JSR).

In one embodiment, the solution polymerized styrene-butadiene rubber is as disclosed in WO 2007/047943 and is functionalized with an alkoxysilane group and a thiol, and comprises the reaction product of a living anionic polymer and a silane-sulfide modifier represented by the formula IV

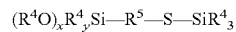

wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and R' is aryl, and alkyl aryl, or $(C_1-C_{16})$ alkyl. In one embodiment, $R^5$ is a $(C_1-C_{16})$ alkyl. In one embodiment, each $R^4$ group is the same or different, and each is independently a $C_1-C_5$ alkyl, and $R^5$ is $C_1-C_5$ alkyl.

The solution polymerized styrene-butadiene rubber in the inner and outer cap layers has a glass transition temperature in a range from −85° C. to −50° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Suitable styrene-butadiene rubbers functionalized with an alkoxysilane group and a thiol group are available commercially, such as Sprintan SLR 3402 from Styron.

Another component of the rubber compositions of the outer cap layer and inner cap layer is natural rubber. Suitable natural rubber is well known to one skilled in the art.

The rubber composition of the inner and outer cap layers also include processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, vegetable oils such as sunflower, soybean, and safflower oils, and monoesters of fatty acids selected from the group consisting of alkyl oleates, alkyl stearates, alkyl linoleates, and alkyl palmitates.

In one embodiment, the rubber compositions of the outer cap layer and inner cap layer includes a low PCA oil. Suitable low PCA oils include but are not limited to mild extraction solvates (MES), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

Suitable TDAE oils are available as Tudalen SX500 from Klaus Dahleke KG, VivaTec 400 and VivaTec 500 from H&R Group, and Enerthene 1849 from BP, and Extensoil 1996 from Repsol. The oils may be available as the oil alone or along with an elastomer in the form of an extended elastomer.

Suitable vegetable oils for the outer cap layer and inner cap layer include, for example, soybean oil, sunflower oil and canola oil which are in the form of esters containing a certain degree of unsaturation.

The rubber compositions of the outer and inner cap layers may optionally include a hydrocarbon traction resin having a glass transition temperature between −40° C. and 100° C. A suitable measurement of Tg for resins is DSC according to ASTM D6604 or equivalent. The hydrocarbon resin has a softening point between 0° C. and 160° C. as determined by ASTM E28 which might sometimes be referred to as a ring and ball softening point. The outer cap layer optionally includes from 5 to 50 phr of hydrocarbon traction resin. The inner cap layer optionally includes from 5 to 15 phr of hydrocarbon traction resin.

The resin is selected from the group consisting of coumarone-indene resins, petroleum resins, terpene polymers, styrene-alphamethylstyrene resins, terpene phenol resins, rosin derived resins and copolymers and/or mixtures thereof.

In one embodiment, the resin is a coumarone-indene resin containing coumarone and indene as the monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cycopentadiene, and diolefins such as isoprene and piperlyene. Suitable coumarone-indene resin is available commercially as Novares C30 from Rutgers Novares GmbH.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species such as cyclopentadiene, dicyclopentadiene, diolefins such as isoprene and piperylene, and any C9 species such as vinyltoluene and alphamethylstyrene. Such resins are made by any mixture formed from C5 and C9 species mentioned above.

In one embodiment, said resin may be a terpene resin comprised of polymers of at least one of limonene, alpha pinene and beta pinene.

The styrene/alphamethylstyrene resin is considered herein to be a relatively short chain copolymer of styrene and alphamethylstyrene with a styrene/alphamethylstyrene molar ratio in a range of about 0.05 to about 1.50. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely, its styrene and alphamethylstyrene contents and by its glass transition temperature, molecular weight and molecular weight distribution.

Terpene-phenol resins may be used. Terpene-phenol resins may be derived by copolymerization of phenolic monomers with terpenes such as limonenes and pinenes.

Resins derived from rosin and derivatives may be used in the present invention. Gum and wood rosin have much the same composition, although the amount of the various isomers may vary. They typically contain about 10 percent by weight neutral materials, 53 percent by weight resin acids containing two double bonds, 13 percent by weight of resin acids containing one double bond, 16 percent by weight of completely saturated resin acids and 2 percent of dehydroabietic acid which contains an aromatic ring but no unsaturation. There are also present about 6 percent of oxidized acids. Representative of the diunsaturated acids include abietic acid, levopimaric acid and neoabietic acid. Representative of the monounsaturated acids include dextroplmaris acid and dihydroabietic acid. A representative saturated rosin acid is tetrahydroabietic acid. Such resins may be in the form of esters of rosin acids and polyols such as pentaerythritol or glycol.

In one embodiment, said resin may be partially or fully hydrogenated.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber compositions of the outer cap layer and inner cap layer include silica. The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

In one embodiment, the weight ratio of silica to oil in the outer cap layer is less than 2.2. In one embodiment, the weight ratio of silica to oil in the outer cap layer is less than 2.

In one embodiment, the weight ratio of silica to total amount of oil and traction resin in the inner cap layer is greater than 2.2. In one embodiment, the weight ratio of silica to total amount of oil and traction resin in the inner cap layer is greater than 3.

The vulcanizable rubber composition may include from about 5 to about 50 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

It may be preferred to have the rubber composition for use in the outer cap layer and inner cap layer to additionally contain a conventional sulfur containing organosilicon compound. Examples of suitable sulfur containing organosilicon compounds are of the formula:

Z-Alk-S$_n$-Alk-Z    V in which Z is selected from the group consisting of

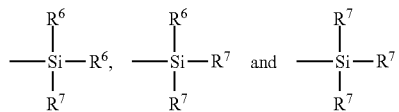

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercap layertosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula V, preferably Z is

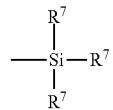

where R$^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula V in a rubber composition will vary depending on the level of other additives that are used. Generally speaking, the amount of the compound of formula V will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compositions may be used in a tire, which may be made by the steps of mixing (A) from about 80 to about 20 phr of a solution polymerized styrene-butadiene rubber having a glass transition temperature (Tg) ranging from −85° C. to −50° C.; (B) from about 20 to about 80 phr of natural rubber; (C) from 30 to 70 phr of a process oil; and (D) from 70 to 150 phr of silica; wherein the weight ratio of silica to oil is less than 2.2, to produce a first rubber composition; mixing (i) from about 60 to about 40 phr of a solution polymerized styrene-butadiene rubber having a glass transition temperature (Tg) ranging from −85° C. to −50° C.; (ii) from about 40 to about 60 phr of natural rubber; and (iii) from about 5 to 40 phr of a process oil; (iv) optionally, from about 5 to 15 phr of a hydrocarbon traction resin; (v) from 60 to 90 phr of silica;
wherein the weight ratio of silica to the sum of oil and traction resin is greater than 2.2.
to produce a second rubber composition; forming a tread comprising an outer tread and an inner tread, wherein the outer tread comprises the first rubber compound and the inner tread comprises the second rubber compound; and incorporating the tread into a tire.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread outer cap layer and tread inner cap layer), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

Example 1

This example illustrates the advantage of a rubber composition suitable as an outer cap compound. Rubber compounds were mixed according to the formulations shown in Table 1, with amounts given in phr. The compounds were cured and tested for physical properties as shown in Table 2.

Sample C1 is made of a blend of NR and cis-BR showing a good balance of wet, winter and RR related properties. In an attempt to further improve RR by maintaining wet and winter related properties, NR in Sample C1 was exchanged with a low Tg SBR in Sample E1, leading to significant RR improvement however at an expense of wet related property. An increase in the level of low Tg SBR from 50 to 75 phr Sample E2 led to an improvement in wet related property whereby keeping RR and Snow properties however the wet property level is not comparable to the excellent level of Sample C1.

It is then attempted to replace cis-BR in Sample C1 with low Tg SBR in Sample E3, leading to very good wet property similar to that of C1, very good winter property similar to that of C1, and an improvement of RR related property.

TABLE 1

| Composition | C1 | E1 | E2 | E3 |
|---|---|---|---|---|
| Styrene-butadiene[1] | 0 | 50 | 75 | 50 |
| Polybutadiene[2] | 50 | 50 | 25 | 0 |
| Natural rubber | 50 | 0 | 0 | 50 |
| Naphthenic oil[3] | 46 | 50 | 48 | 42 |
| Antioxidant(s) | 4.5 | 4.5 | 4.5 | 4.5 |
| Stearic acid | 3 | 3 | 3 | 3 |
| Silane[4] | 5.6 | 5.6 | 5.6 | 5.6 |
| Silica[5] | 90 | 90 | 90 | 90 |
| ZnO | 2.5 | 2.5 | 2.5 | 2.5 |
| Sulfur | 1.6 | 1.6 | 1.6 | 1.6 |
| Accelerator | 3.4 | 4.6 | 4.8 | 3.9 |

[1]Solution polymerized SBR with styrene content of 15% and 1,2-vinyl content of 30%, Tg = −60° C. obtained from Styron as SLR3402.
[2]High cis polybutadiene, obtained as Budene 1207 from The Goodyear Tire & Rubber Company.
[3]Naphthenic oil of Tg = −76° C.
[4]TESPD type silane coupling agent
[5]Hi-Sil 315G-D precipitated silica from PPG with a CTAB surface area of 125 m2/g

TABLE 2

| Composition | C1 | E1 | E2 | E3 |
|---|---|---|---|---|
| Dynamic properties (100° C.)[1] | | | | |
| G' at 1% strain (MPa) | 1.63 | 1.27 | 1.33 | 1.61 |
| Tensile properties[2] | | | | |
| Modulus at 300% strain (MPa) | 6.4 | 7.4 | 8.3 | 8.8 |
| Tensile strength (MPa) | 14 | 11.6 | 11.1 | 14.1 |
| Elongation at break (%) | 617 | 449 | 400 | 469 |
| Low temperature property[3] | | | | |
| G' at 1.5% strain, −20° C. (MPa) | 6.0 | 3.3 | 3.5 | 5.8 |
| Wet grip property[4] | | | | |
| Rebound at 0° C. (%) | 36.2 | 49 | 46.6 | 35.8 |
| RR property[4] | | | | |
| Rebound at 100° C. (%) | 61.6 | 70.1 | 70.9 | 65.3 |

[1]Data according to Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[2]Data according to Automated Testing System instrument by the Instron Corporation. Such instrument may determine ultimate tensile, ultimate elongation, modulii, etc.
[3]The G' modulus at low temperatures can be readily be determined by a Metravib TM instrument at 1.5 percent strain and 7.8 Hertz. The test method is understood to be similar to ISO 4664 and DIN 53513.
[4]Rebound is a measure of hysteresis of the compound when subject to loading, as measured by ASTM D1054. Generally, the lower the measured rebound at 0° C., the better the wet grip property. Generally, the higher the measured rebound at 100° C., the lower the rolling resistance.

Example 2

This example illustrates the advantage of a rubber composition suitable as an inner cap compound. Rubber compounds were mixed according to the formulations shown in Table 3, with amounts given in phr. The compounds were cured and tested for physical properties as shown in Table 4.

Sample C2 is made of a blend of NR and cis-BR, with a silica to oil ratio lower than 2.2, showing a good balance of wet, winter and RR related properties. In order to further improve properties, cis-BR in Sample C2 was exchanged with a functionalized low Tg s-SBR in Samples E4 to E6, along with ratio of silica to the sum of oil and resin to greater than 2.2, leading to significant RR, Snow and Wet related properties over Sample C2.

TABLE 3

| Composition | C2 | E4 | E5 | E6 |
|---|---|---|---|---|
| Styrene-butadiene[1] | | 30 | 30 | 30 |
| Natural rubber | 70 | 70 | 70 | 70 |
| Cis-polybutadiene[2] | 30 | | | |
| Naphthenic oil[3] | 42 | 19 | 10 | 32 |
| Traction resin[4] | | | 9 | |
| Antioxidant(s) | 4 | 4 | 4 | 4 |
| Stearic acid | 3 | 3 | 3 | 3 |
| Silane[5] | 5.6 | 4.7 | 4.7 | 6.0 |
| Silica[6] | 90 | 75 | 75 | |
| Silica[7] | | | | 75 |
| Carbon Black | 2 | 2 | 2 | 2 |
| ZnO | 2.5 | 2.5 | 2.5 | 2.5 |
| Sulfur | 1.6 | 1.2 | 1.2 | 1.2 |
| Accelerator | 3.0 | 3.5 | 3.5 | 3.9 |

[1]Solution polymerized SBR with styrene content of 15% and 1,2-vinyl content of 30%, Tg = −60° C. obtained from Styron as SLR3402.
[2]High-cis polybutadiene obtained as BUD1207 from Goodyear Chemical.
[3]Naphthenic oil of Tg = −76° C.
[4]Polyterpene traction resin with a softening point 115° C. obtained as Sylvarez TR7115
[5]TESPD type silane coupling agent
[6]Hi-Sil 315G-D precipitated silica from PPG with a CTAB surface area of 125 m2/g
[7]1165MP precipitated silica from Solvay with a CTAB surface area of 160 m2/g.

TABLE 2

| Composition | C2 | E4 | E5 | E6 |
|---|---|---|---|---|
| Dynamic properties (100° C.)[1] | | | | |
| G' at 1% strain (MPa) | 1.7 | 1.7 | 1.7 | 1.5 |
| Tensile properties[2] | | | | |
| Modulus at 300% strain (MPa) | 6.9 | 9.5 | 10.2 | 9.1 |
| Tensile strength (MPa) | 14.8 | 22.0 | 22.7 | 23.0 |
| Elongation at break (%) | 604 | 585 | 571 | 617 |
| Low temperature property[3] | | | | |
| G' at 1.5% strain, −20° C. (MPa) | 6.9 | 5.0 | 6.4 | 5.1 |
| Wet grip property[4] | | | | |
| Rebound at 0° C. (%) | 33.2 | 33.2 | 25.8 | 36.9 |
| RR property[4] | | | | |
| Rebound at 100° C. (%) | 62.3 | 67.3 | 65.2 | 67.8 |

[1]Data according to Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[2]Data according to Automated Testing System instrument by the Instron Corporation. Such instrument may determine ultimate tensile, ultimate elongation, modulii, etc.
[3]The G' modulus at low temperatures can be readily be determined by a Metravib TM instrument at 1.5 percent strain and 7.8 Hertz. The test method is understood to be similar to ISO 4664 and DIN 53513.
[4]Rebound is a measure of hysteresis of the compound when subject to loading, as measured by ASTM D1054. Generally, the lower the measured rebound at 0° C., the better the wet grip property. Generally, the higher the measured rebound at 100° C., the lower the rolling resistance.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a tread comprising a radially outer cap layer and radially inner cap layer underlying the outer cap layer;
   the outer cap layer comprising a vulcanizable rubber composition comprising, based on 100 parts by weight of elastomer (phr),
   (A) from about 80 to about 20 phr of a solution polymerized styrene-butadiene rubber having a glass transition temperature (Tg) ranging from −85° C. to −50° C.;
   (B) from about 20 to about 80 phr of natural rubber; and
   (C) from 30 to 70 phr of a process oil;
   (D) from 70 to 150 phr of silica;
   wherein the weight ratio of silica to oil in the outer cap is less than 2.2;
   the inner cap layer comprising a vulcanizable rubber composition comprising:
   (i) from about 60 to about 40 phr of a solution polymerized styrene-butadiene rubber having a glass transition temperature (Tg) ranging from −85° C. to −50° C.;
   (ii) from about 40 to about 60 phr of natural rubber;
   (iii) from about 5 to 40 phr of a process oil;
   (iv) from about 5 to 15 phr of a hydrocarbon traction resin; and
   (v) from 60 to 90 phr of silica;
   wherein the weight ratio of silica to the sum of oil and traction resin is greater than 2.2.

2. The pneumatic tire of claim 1, wherein at least one of the solution polymerized styrene-butadiene rubber is functionalized with an alkoxysilane group and at least one functional group selected from the group consisting of primary amines and thiols.

3. The pneumatic tire of claim 1, wherein the oil is selected from the group consisting of aromatic, paraffinic, naphthenic, MES, TDAE, heavy naphthenic oils, and vegetable oils.

4. The pneumatic tire of claim 1, wherein the solution polymerized styrene-butadiene rubber is functionalized with an alkoxysilane group and a primary amine group comprises the reaction product of a living polymer chain and a terminating agent of the formula

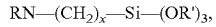

$$RN-(CH_2)_x-Si-(OR')_3, \quad I$$

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20.

5. The pneumatic tire of claim 1 wherein the solution polymerized styrene-butadiene rubber is functionalized with an alkoxysilane group and a thiol, and comprises the reaction product of a living anionic polymer and a silane-sulfide modifier represented by the formula

$$(R^4O)_x R^4_y Si-R^5-S-SiR^4_3$$

wherein Si is silicon; S is sulfur; O is oxygen; x is an integer selected from 1, 2 and 3; y is an integer selected from 0, 1, and 2; x+y=3; $R^4$ is the same or different and is ($C_1$-$C_{16}$) alkyl; and R' is aryl, and alkyl aryl, or ($C_1$-$C_{16}$) alkyl.

6. A method of making a pneumatic tire, comprising the steps of
   mixing (A) from about 80 to about 20 phr of a solution polymerized styrene-butadiene rubber having a glass transition temperature (Tg) ranging from −85° C. to −50° C.; (B) from about 20 to about 80 phr of natural rubber; (C) from 30 to 70 phr of a process oil; and (D) from 70 to 150 phr of silica; wherein the weight ratio of silica to oil is less than 2.2, to produce a first rubber composition;
   mixing (i) from about 60 to about 40 phr of a solution polymerized styrene-butadiene rubber having a glass transition temperature (Tg) ranging from −85° C. to −50° C.; (ii) from about 40 to about 60 phr of natural rubber; (iii) from about 5 to 40 phr of a process oil; (iv) from about 5 to 15 phr of a hydrocarbon traction resin; and (v) from 60 to 90 phr of silica; wherein the weight ratio of silica to the sum of oil and traction resin is greater than 2.2, to produce a second rubber composition; and
   forming a tread comprising an outer tread and an inner tread, wherein the outer tread comprises the first rubber compound and the inner tread comprises the second rubber compound; and incorporating the tread into a tire.

* * * * *